(12) United States Patent
Fujioka et al.

(10) Patent No.: US 6,514,675 B1
(45) Date of Patent: Feb. 4, 2003

(54) MANUFACTURING APPARATUS AND METHOD FOR OPTICAL RECORDING MEDIUM

(75) Inventors: Toshiyuki Fujioka, Osaka (JP); Hideo Matsumoto, Osaka (JP); Norihide Higaki, Ibaraki (JP); Koji Muraoka, Ikoma (JP); Hiroyuki Fukuno, Kadoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/671,277

(22) Filed: Sep. 27, 2000

(30) Foreign Application Priority Data

Sep. 27, 1999 (JP) .......................................... 11-271473

(51) Int. Cl.⁷ .............................. B05D 3/06; F26B 3/24; B05C 9/12
(52) U.S. Cl. ................ 430/321; 156/272.2; 156/275.7; 156/373.3; 414/244.6; 414/757; 118/641; 34/275; 34/277
(58) Field of Search ................................ 430/321, 347; 156/99, 373.3, 275.5, 275.7; 118/642, 52; 34/275, 277; 414/744.6, 757, 935

(56) References Cited

U.S. PATENT DOCUMENTS

| | | | | |
|---|---|---|---|---|
| 4,707,773 A | * | 11/1987 | Miyamoto et al. | ............ 362/303 |
| 4,967,487 A | * | 11/1990 | Urquhart | ........................ 34/66 |
| 5,056,081 A | * | 10/1991 | Hsieh | ........................... 369/100 |
| 5,411,588 A | * | 5/1995 | Diepens et al. | ............. 118/666 |
| 5,785,793 A | * | 7/1998 | Arai et al. | ................ 156/275.7 |
| 5,907,534 A | * | 5/1999 | Yamatsu | .................... 369/286 |
| 6,074,482 A | * | 6/2000 | Weber et al. | ................ 118/642 |
| 6,180,200 B1 | * | 1/2001 | Ha et al. | ..................... 430/945 |
| 6,231,705 B1 | * | 5/2001 | Kanashima et al. | ..... 156/275.7 |

FOREIGN PATENT DOCUMENTS

| | | | | |
|---|---|---|---|---|
| CZ | 80117 | * | 1/1951 | ................. 118/642 |
| JP | 06-342552 | * | 12/1994 | |
| WO | WO 97/21495 | * | 6/1997 | |

* cited by examiner

*Primary Examiner*—Martin Angebrannt
(74) *Attorney, Agent, or Firm*—Parkhurst & Wendel, L.L.P.

(57) ABSTRACT

An optical disk is provided by bonding two substrates to each using a radiation-hardening resin, and leveling and hardening the resin. In an optical recording medium manufacturing apparatus including lamps for emitting radiation to two disks attached to each other with a radiation-hardening resin layer sandwiched therebetween, and a rotation arm for supporting and rotating the two disks to allow the disks to traverse the emission area of the lamps, light source centers of the lamps are positioned radially outside a rotation locus of the center of the disks attached to each other, said locus being drawn while the disks are supported by the rotation arm.

8 Claims, 3 Drawing Sheets

MANUFACTURING APPARATUS AND METHOD FOR OPTICAL RECORDING MEDIUM

FIELD OF THE INVENTION

The present invention relates to an apparatus and a method for manufacturing an optical information recording medium obtained by bonding two substrates.

BACKGROUND OF THE INVENTION

The technology of reproducing or recording information with high density using a laser beam is well known, and has put an optical disk to practical use. Optical disks can be classified into reproduce-only-type disks, additive-write-type disks, and rewrite-type disks.

Reproduce-only-type disks are manufactured as compact disks recording music information, laser disks recording image information, and so on. Additive-write-type disks are manufactured as document files, static image files, and so on. Rewrite-type disks are manufactured as data files for personal computers or the like.

A typical optical disk is manufactured by covering approximately 1.2 mm thick transparent resin circular substrate one side of which is an information layer with a protective coating film or the like, or with a protective plate having the same size as the substrate bonded on the information layer.

Recently, it has been investigated to use a shorter laser waveform and an objective having a larger numerical aperture (NA) in order to realize a high-density optical disk.

However, an optical disk with a shorter waveform and a larger NA has a problem that an angle between the inclination of a disk and the direction of an input laser beam, that is, a tilt allowance, is small.

It is known, in this case, that a thinner circular substrate (hereinafter referred to simply as a substrate) is effective to have a larger tilt allowance. For example, a substrate of a digital video disk (DVD) is 0.6 mm thick. Since a 0.6 mm thick resin substrate is not mechanically strong, two substrates are bonded for reinforcement with the information recording surface set inside.

As a method of bonding two substrates, there is a radiation hardening method in which radiation-hardening resin is applied to one substrate on which another substrate is bonded with radiation emitted for hardening. In this connection ultraviolet rays (UV) are used as radiation.

In this radiation hardening method, the radiation-hardening resin is circularly applied to a substrate rotating at a low speed, then another substrate is bonded on it into one sheet. After the radiation-hardening resin is sufficiently spread between the substrates while rotating the substrates at a high speed, the radiation is emitted for a hardening process.

When the radiation hardening process is performed, the substrate is attached at the end of a rotation arm for rotary movement of the emission area of a radiation lamp.

In this rotary movement system, the center of the substrate conventionally supported by the rotation arm is set as the center of a light source, for example, the center of the longitudinal length when a cylindrical lamp is used. When two lamps are used, the lamps are arranged in parallel with the center of the substrate passing through each of the centers of the light sources.

In the optical recording medium manufacturing apparatus with the above mentioned configurations, a substrate rotates such that the center of the substrate passes through the center of the light source of a cylindrical lamp. Therefore, the rotating speed at an outer circular portion of the substrate is high while the rotating speed at an inner circular portion of the substrate is low with the center of the light source of a cylindrical lamp set as the center. As a result, there arises the problem that the amount of accumulated radiation at the outer circular portion is smaller than that at the inner circular portion.

Therefore, the accumulated radiation cannot be symmetrically applied onto a substrate, thereby causing poor resin hardening balance and uneven surface of a bonded substrate.

The present invention has been developed to solve the above mentioned problem and aims at improving the bonding precision without uneven disk surface.

SUMMARY OF THE INVENTION

To attain the above mentioned subject, an object of the present invention is to remove the difference in the amount of accumulated radiation between an outer circular portion and an inner circular portion of a disk by positioning the center of the light source of a lamp at a position radially outside the rotation locus of the center of the disk supported by the rotation arm.

Therefore, regardless of the rotating speed, the amount of accumulated radiation can be equalized between the radially inner and outer portions.

The optical recording medium manufacturing apparatus according to the present invention includes: a lamp for emitting radiation to two sheets of disks attached to each other with a radiation-hardening resin layer sandwiched therebetween; and a rotation arm for supporting the two disks and rotating them such that the disks can traverse an emission area of the lamp. The center of the light source of the lamp is positioned radially outside the rotation locus of the center of the disks, the rotation locus being drawn while the disks are supported by the rotation arm.

With the above mentioned configuration, the distribution of hardened resin can be symmetric, and the amount of accumulated radiation can be substantially equalized between the inner and outer circular portions on a disk, thereby manufacturing a precision optical recording medium without any uneven surface.

In addition, in the optical recording medium manufacturing apparatus, the lamp is cylindrical, and the longitudinal axis of the cylindrical lamp traverses the rotation locus of a disk.

With this configuration, the amount of accumulated radiation can be equalized with respect to a point light source.

Also with the above mentioned configuration, the longitudinal axis of a cylindrical lamp is arranged to be radially outside the center of the rotation arm.

In this case, since a substrate traverses the lamp at right angles along the circumference of the disk, the amount of radiation can be further equalized.

A method for manufacturing an optical recording medium according to the present invention is a method in which two disks attached to each other with a resin sandwiched therebetween are rotated around a perpendicular axis outside the disks while one or more lamps emit radiation from above a part of a rotation locus area of the disks, thereby to manufacture an optical recording medium. At this time, an amount of radiation per unit area at each point on the disks is proportioned to a distance of said each point from the perpendicular rotation axis.

As described above, according to the present invention, the amount of the accumulated radiation can be well balanced on a hardened resin substrate although it is rotated by a rotation arm, thereby manufacturing an optical recording medium free of uneven surface with high bonding precision.

BRIEF DESCRIPTION OF THE DRAWINGS

FIG. 1 is an oblique view of a central part of a substrate manufactured by an optical recording medium manufacturing apparatus according to an embodiment of the present invention, wherein

DESCRIPTION OF THE EMBODIMENTS

Described below is the optical recording medium manufacturing apparatus according to an embodiment of the present invention.

Figure 1A:
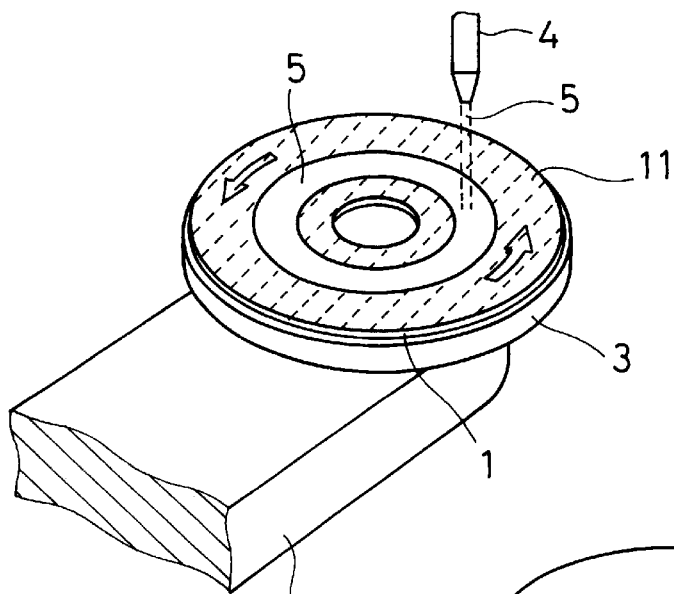
FIG. 1A shows a step of applying radiation-hardening resin.
Figure 1B:
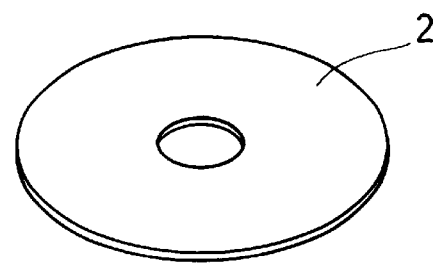
FIG. 1B is an oblique view of another substrate for bonding.
Figure 1C:
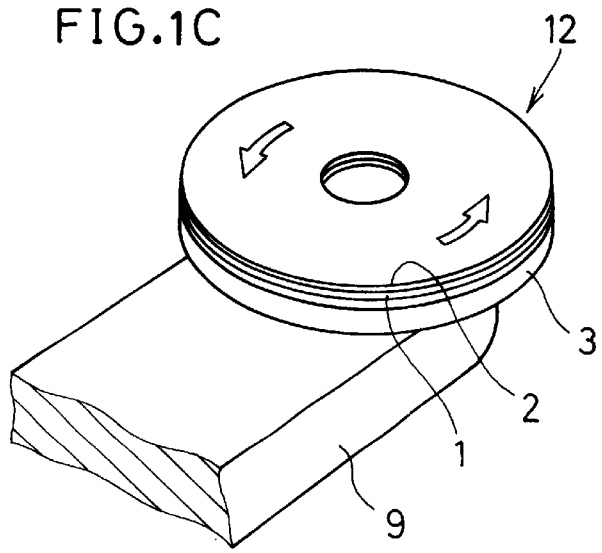
FIG. 1C is an oblique view of bonded substrates.

FIG. 1 is an oblique view of the central part of a substrate manufactured by the optical recording medium manufacturing apparatus according to an embodiment of the sent invention. FIG. 1A shows a step of applying radiation-hardening resin. FIG. 1B is an oblique view of another substrate for bonding. FIG. 1C is an oblique view of the bonded substrates.

The units 1 and 2 respectively shown in FIGS. 1A and 1B are substrates manufactured by an injection method. The size of the disks can be 0.6 mm thick, 120 mm in diameter, 15 mm in diameter of the central hole, etc. The disks are mainly made of polycarbonate.

As shown in FIG. 1A, on one side of a substrate 1, an information signal is recorded as an pit forming concavity and convexity on the substrate 1 in advance (not shown in FIG. 1A). To the substrate 1, a reflective layer 11 of approx. 100 nm thick film mainly of aluminum is applied in advance, thereby reading the information signal from the other side of the reflective layer 11 of the substrate 1 by the radiation of a laser beam.

Another substrate 2 shown in FIG. 1B is a dummy substrate to be attached to increase mechanical reinforcement. This substrate is formed with no film of a reflective layer.

The above mentioned substrate 1 is mounted on a table 3 provided with adsorption means (not shown in the drawings) as shown in FIG. 1A. A nozzle 4 is provided on the substrate 1 fixed on the table 3 using the adsorption means. The table 3 rotates at a low speed, for example, at 100 rpm, and a radiation-hardening resin 5 such as ultraviolet ray-hardening resin is dropped.

Thus, the radiation-hardening resin 5 is circularly applied to the substrate 1.

Then, the another substrate 2 is closely attached onto the substrate 1 coaxially as shown in FIG. 1C.

After closely attaching the two substrates to each other, the radiation-hardening resin 5 can be spread between the substrates 1 and 2 due to the self weight of the substrate 2 and the capillary phenomenon.

When the rotation table 3 rotates at a high speed, for example, at 2000 rpm, the spread of the radiation-hardening resin 5 is accelerated radially toward the outer circumference of the substrates, thereby shortening the processing time and resulting in a well-balanced application of the resin.

Thus, two disks 12 attached to each other with a radiation-hardening resin layer 5 sandwiched therebetween are prepared.

Next, description will be made of the optical recording medium manufacturing apparatus which hardens the radiation-hardening resin layer.

Figure 2:
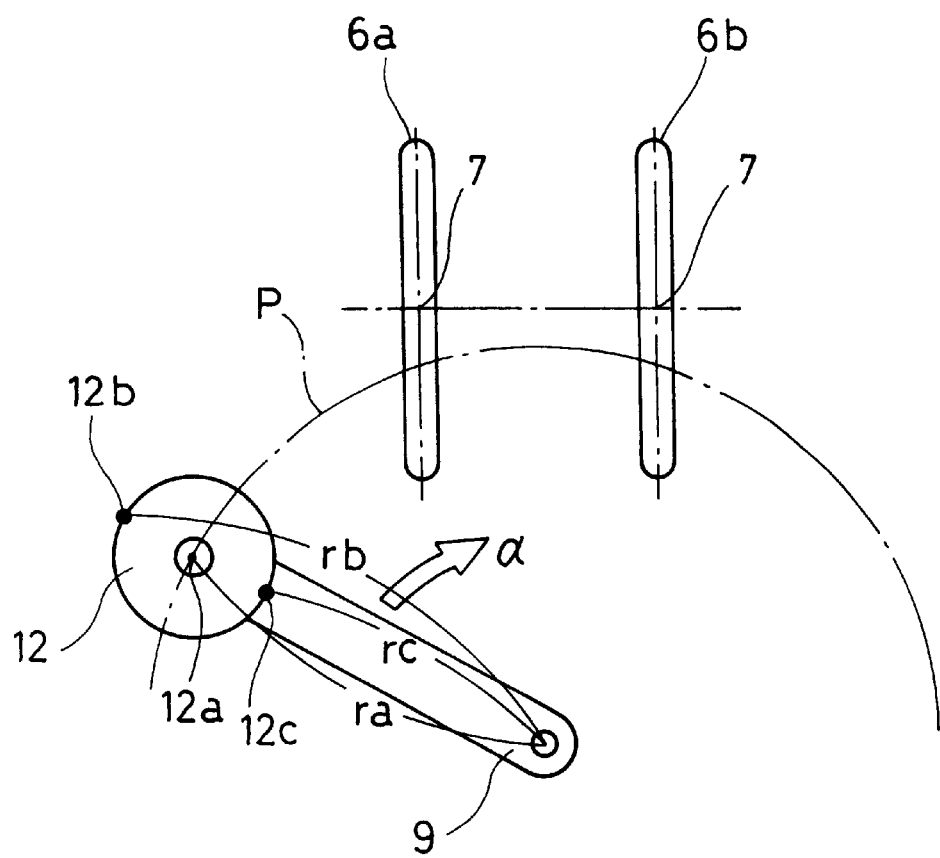
FIG. 2 shows an arrangement of units in the configuration of the optical recording medium manufacturing apparatus according to an embodiment of the present invention.

FIG. 2 is a plan view showing the positional relation between a rotation arm and an emission lamp or lamps of the optical recording medium manufacturing apparatus.

In FIG. 2, both radiation emitting lamps 6a and 6b such as ultraviolet ray-emitting lamps are cylindrical lamps, and a light source center 7 is located at the central point of the longitudinal direction of the respective cylindrical lamps 6a and 6b.

One of the cylindrical lamps, 6a, is a provisionally hardening lamp, and the other lamp 6b is a final hardening lamp. These lamps are arranged in parallel to each other. The radiation-hardening resin sandwiched between the two disks 12 can be hardened while the disks pass under these cylindrical lamps 6a and 6b sequentially.

The two disks 12 attached to each other are supported by a rotation arm 9 such that the rotation locus of the center point 12a of the two disks 12 draws a curve P shown in FIG. 2.

Then, the light source centers 7 of the two cylindrical lamps 6a and 6b are positioned radially outside the curve P representing the rotation locus.

Next, description will be made how the radiation emission is operated by the optical recording medium manufacturing apparatus.

The two substrates 12 attached to each other with a radiation-hardening resin layer sandwiched therebetween are supported by the rotation arm 9, and move in the emission area of the cylindrical lamps 6a and 6b while drawing an arc.

At this time, the center 12a of the substrates 12 moves while rotating along the locus P in an area radially inside the light source centers 7 of the cylindrical lamps 6a and 6b.

Assuming that the angular speed of the rotation arm 9 is $\alpha$, the rotation speeds va to vc respectively at a center point 12a, a point 12b radially outside the center point 12a, and a point 12c radially inside the center point 12a may be expressed as follows:

$$va = ra \cdot \alpha \quad vb = rb \cdot \alpha \quad vc = rc \cdot \alpha \tag{1}$$

where ra to rb represent the rotation radii of the points 12a to 12c, respectively.

Since rb>ra>rc, and $\alpha$ is constant, the following expression exists.

$$vb > va > vc$$

Assuming that the amount of emitted radiation is constant, and the amount of radiation per unit area is s, the amount Sb of radiation at an outer point, the amount Sa of radiation at the center point, and the amount Sc of radiation at an inner point, each with respect to width L, may be respectively expressed as follows:

$$Sb = s \cdot L/vb \quad Sa = s \cdot L/va \quad Sc = s \cdot L/cv \tag{2}$$

Therefore, Sc>Sa>Sb

That is, if the locus of the center of the substrates matches the optical center of the emission lamp, there arises a difference of Sc−Sb in the amount of radiation between an outer point and an inner point.

However, in the above mentioned embodiment, the optical center 7 of the emission lamp is positioned outside the locus P, and the amount of radiation per unit area at an outer point is larger than that at an inner point. Assuming that the amount of radiation per unit area at an outer point is qb, and that at an inner point is qc, it naturally stands as follows:

$$qb>qc$$

When s in the equation (2) is respectively substituted by qb and qc, the equation (2) may be expressed as follows.

$$Sb=qb·L/vb,\ Sa=s·L/va,\ Sc=qc·L/vc$$

Thus, Sc, Sa and Sb can be substantially equal to one another by adjusting the position of the optical center of the cylindrical lamps 6a and 6b.

That is, although the radiation is emitted using the rotation arm 9, the radiation distribution by the emission lamp can be uniform on the entire disks, thereby solving the problem of uneven surface or poor bonding caused by unequal radiation distribution.

As an example of the above mentioned embodiment, the case in which cylindrical lamps are arranged in parallel with the diameter of the rotation region has been described above. However, as shown in FIG. 3, the cylindrical lamps 6a and 6b may also be radially arranged.

Figure 3:
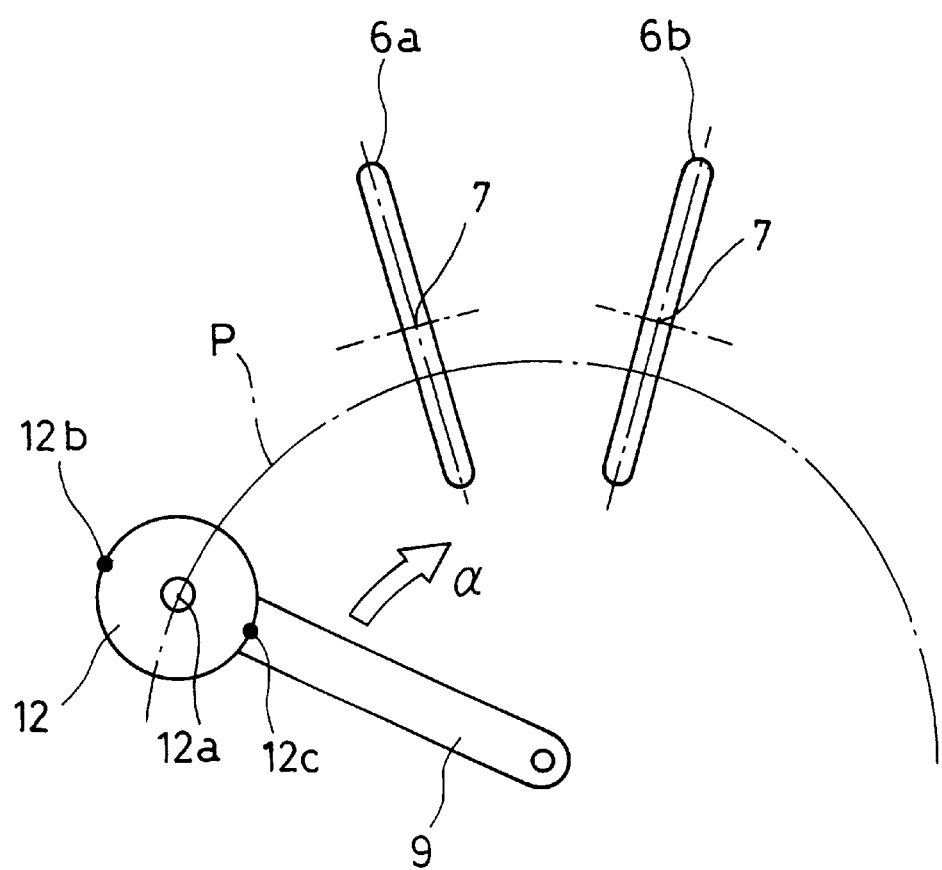
FIG. 3 shows an arrangement of the units in another configuration of the optical recording medium manufacturing apparatus according to an embodiment of the present invention.

Since the configuration of this embodiment is the same as that of the embodiment shown in FIG. 2 except that the cylindrical lamps 6a and 6b are radially arranged, FIG. 3 indicates the same reference symbols as those in FIG. 2 with detailed explanations being omitted.

Although not shown in the drawings, the cylindrical lamp may be replaced with a bulb-form lamp by positioning the optical center radially outside. The present invention can also be realized by providing only one or three or more cylindrical or bulb-form lamps and locating each optical center outside the rotation region.

What is claimed is:

1. An optical recording medium manufacturing apparatus, comprising:

at least one lamp for irradiating two disks attached to each other with a radiation-hardening resin sandwiched therebetween; and a rotation arm for supporting and rotating the two disks about a rotation axis of the rotation arm such that the disks traverse an emission area of the lamp, wherein a center of the at least one lamp is further from the rotation axis than an arc defined by the center of the discs through the travel of the rotation arm, and the at least one lamp is cylindrical with its longitudinal axis approximately perpendicular to the tangent of an arc defined by the center of the discs through the travel of the rotation arm and at least a portion of the at least one cylindrical lamp is within the radius of said arc.

2. The optical recording medium manufacturing apparatus according to claim 1, wherein the longitudinal axis of the cylindrical lamp extends toward the rotation axis of the rotation arm.

3. A resin hardening method of an optical recording medium, comprising:

supporting two disks attached to each other with a radiation-hardening resin layer sandwiched therebetween with a rotation arm, and rotating the disks around a rotation axis of the rotation arm that is located outside of and perpendicular to the disks; and irradiating with at least one lamp each small portion on the rotating disks with an amount of radiation per unit area that is substantially proportional to a distance of said each small portion from the rotation axis, wherein said at least one lamp is cylindrical with its longitudinal axis approximately perpendicular to the tangent of the arc defined by the center of the discs through the travel of the rotation arm.

4. The resin hardening method of an optical recording medium according to claim 3, wherein the at least one lamp is positioned such that a distance of a light source center of the lamp from the rotation axis is longer than a distance of an outermost portion of the disks from the rotation axis.

5. The resin hardening method of an optical recording medium according to claim 4, wherein all of said at least one lamp have equal lengths.

6. The resin hardening method of an optical recording medium according to claim 5, wherein the longitudinal axes of the plurality of cylindrical lamps are directed toward the rotation axis.

7. The resin hardening method of an optical recording medium according to claim 4, wherein the longitudinal axis of each lamp is perpendicular to the tangent of the arc defined by the center of the discs through the travel of the rotation arm about a rotation axis and extends toward the rotation axis.

8. A method for manufacturing an optical recording medium, comprising:

attaching two resin disks to each other with a layer of radiation-hardening resin sandwiched therebetween;

rotating the disks at a predetermined angular speed around a fixed perpendicular axis located outside the disks while using said rotation arm to keep said disks horizontal;

uniformly hardening the resin using at least one lamp located above a part of a rotation locus area of the rotating disks for irradiating each small portion on the rotating disks with an amount of radiation per unit area that is substantially proportional to a distance of said each small portion from the rotation axis, wherein
the at least one lamp is cylindrical with its longitudinal axis approximately perpendicular to the tangent of an arc defined by the center of the discs through the travel of the rotation arm and at least a portion of the at least one cylindrical lamp is within the radius of said arc.

* * * * *